Nov. 21, 1967  G. R. NEAL  3,353,841
FIFTH WHEEL SAFETY DEVICE TO PREVENT JACK-KNIFING
Filed Oct. 23, 1965  4 Sheets-Sheet 1
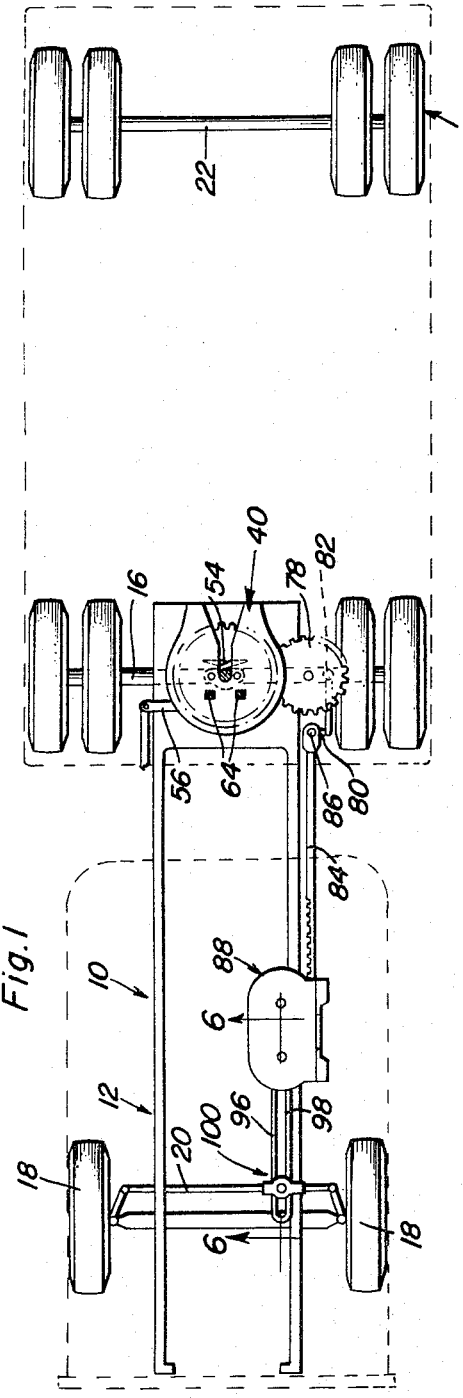
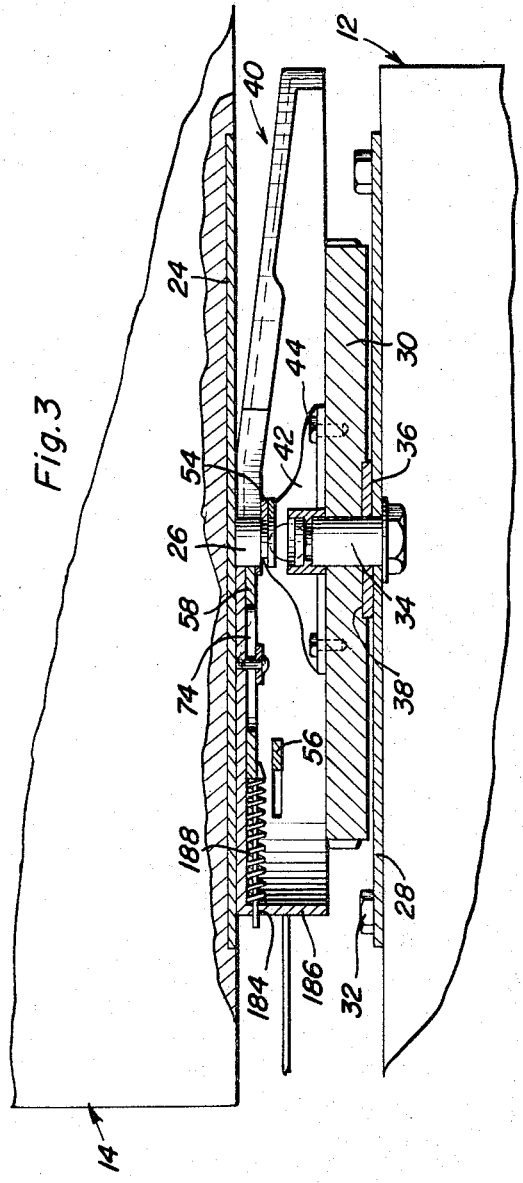
Gary R. Neal
INVENTOR.
BY Clarence A. O'Brien
and Harvey B. Jacobson
Attorneys Nov. 21, 1967 G. R. NEAL 3,353,841
FIFTH WHEEL SAFETY DEVICE TO PREVENT JACK-KNIFING
Filed Oct. 23, 1965 4 Sheets-Sheet 2
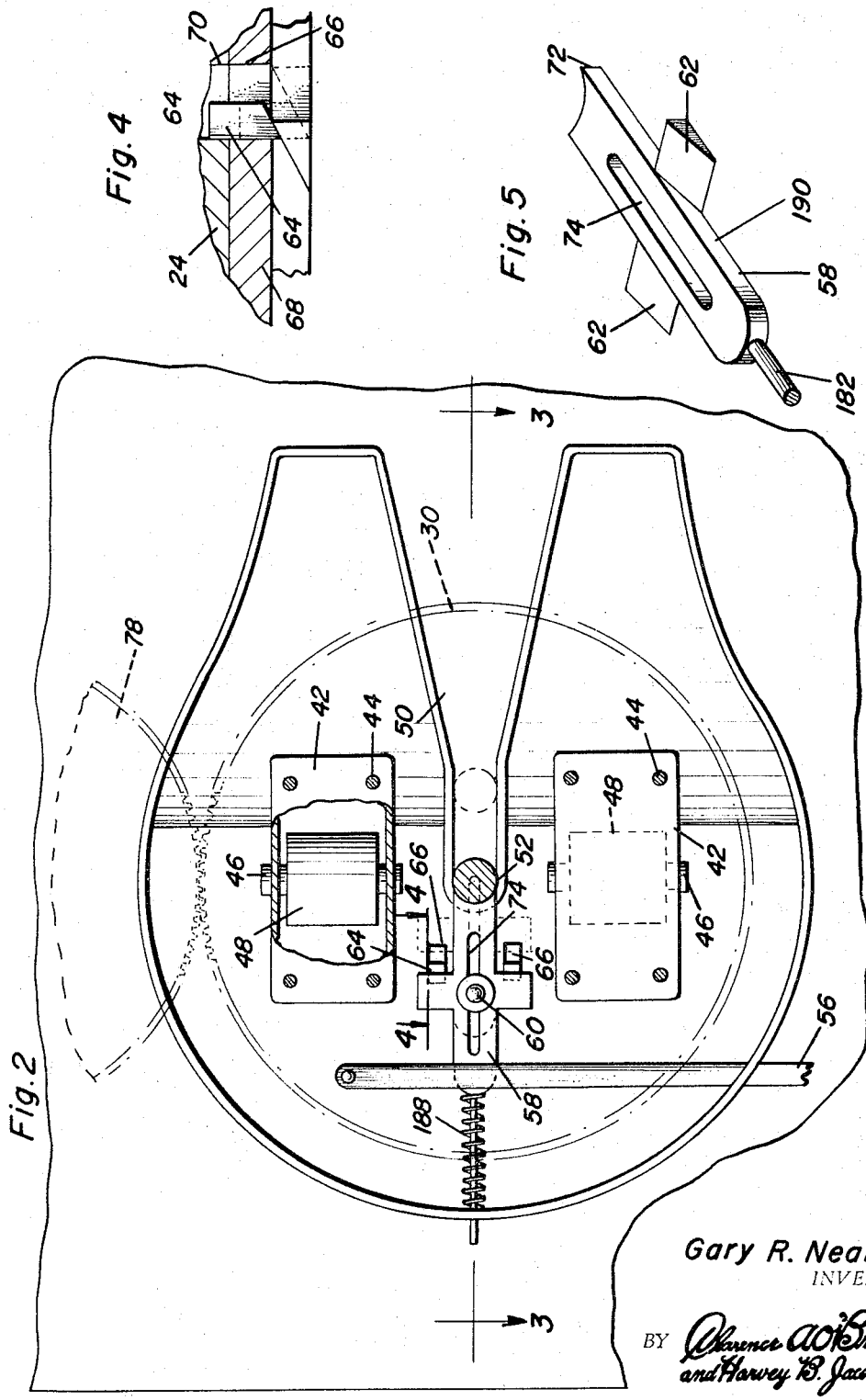
Gary R. Neal
INVENTOR.

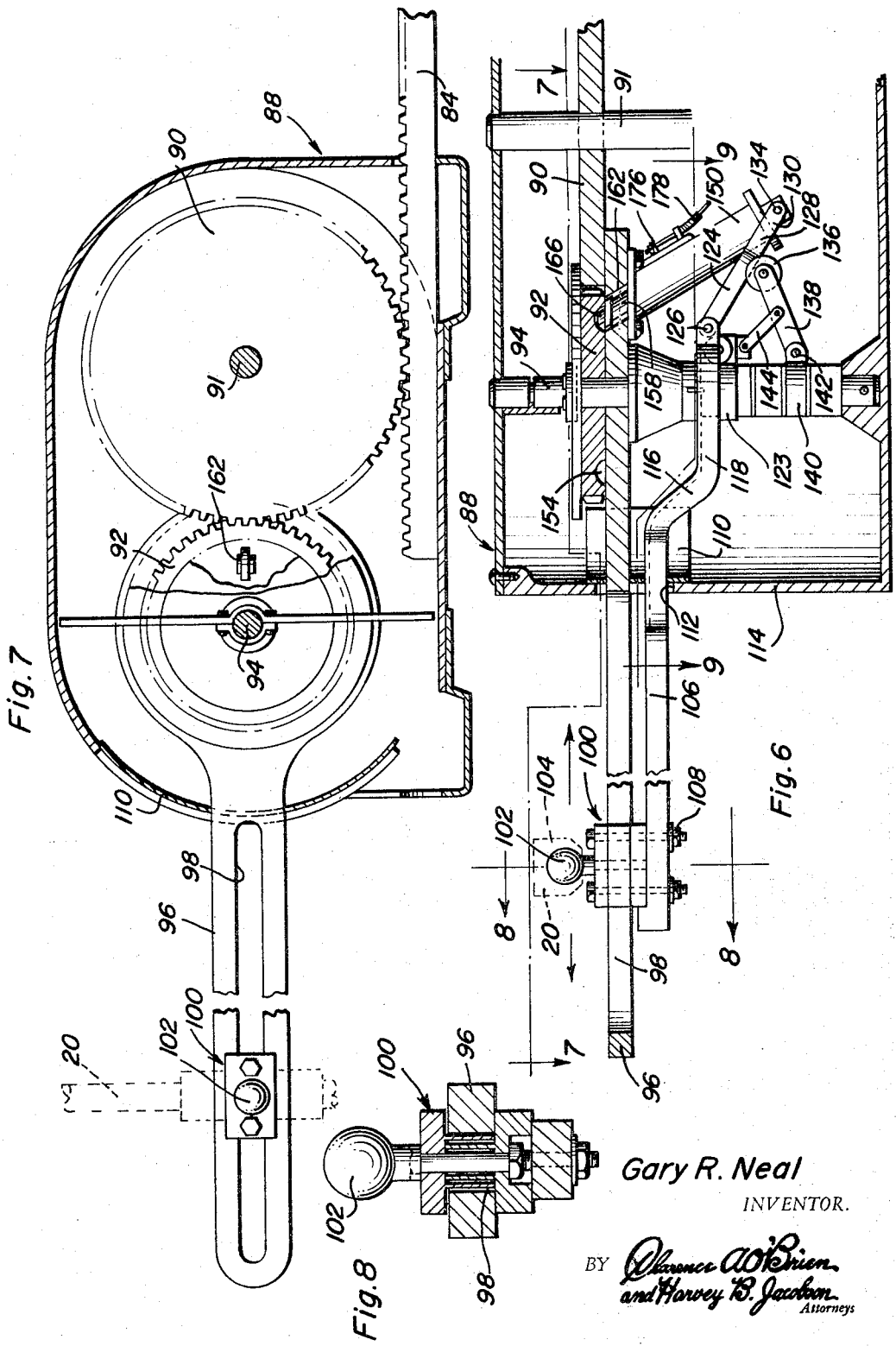

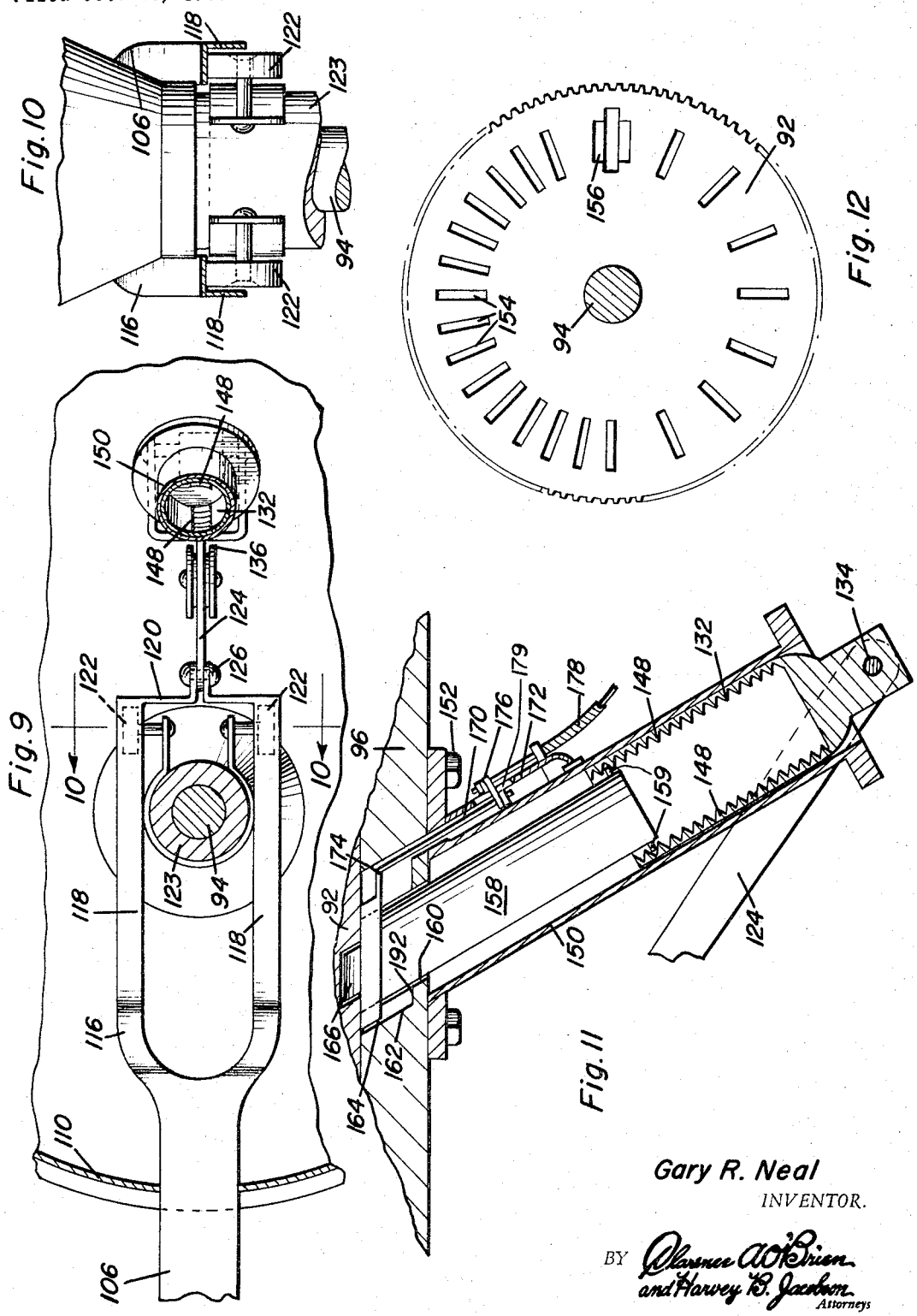

United States Patent Office 3,353,841
Patented Nov. 21, 1967

3,353,841
FIFTH WHEEL SAFETY DEVICE TO PREVENT JACK-KNIFING
Gary R. Neal, Baltimore, Md., assignor of thirty-three and one-third percent to James E. Neal, Jr., Baltimore, Md.
Filed Oct. 23, 1965, Ser. No. 505,317
7 Claims. (Cl. 280—432)

ABSTRACT OF THE DISCLOSURE

A pivot limiting structure connected between a semi-trailer and the tractor to which the semi-trailer is pivotally connected and operative to allow only slight relative pivotal movement between the tractor and semi-trailer with a motion-transmitting control operatively connected to the steerable front wheels of the tractor and to the pivot-limiting mechanism responsive to adjustment of the front wheels of the tractor to allow a change in the angularly displaced positions of the tractor and semi-trailer, other than the slight relative pivotal movement above referred to, only to the relative positions which would normally be effected independent of the pivot-limiting mechanism if the steerable front wheels of the tractor were held stationary in adjusted position and the tractor and semi-trailer were moving forward with no side slippage of the wheels of the tractor and semi-trailer.

This invention relates to a novel and useful fifth wheel safety device and more specifically to an apparatus designed to be utilized on a tractor and semi-trailer combination of the type wherein the front end portion of the semi-trailer is pivotally secured to the rear end portion of the tractor by means of a fifth wheel assembly. This type of tractor and semi-trailer combination is of course well known with the fifth wheel assembly defining an upstanding pivot axis of relative rotation between the tractor and semi-trailer portions.

When traveling over a roadway in a straight direction the tractor and semi-trailer portions of a tractor and semi-trailer combination vehicle are longitudinally aligned. However, the pivot connection between the tractor and the semi-trailer portions of the combination enables the combination to be more maneuverable and the longitudinal centerlines of the tractor and semi-trailer portions of the combination to be angularly disposed relative to each other during turning movements of the combination.

The ability of a semi-trailer to pivot relative to its associated tractor can present a dangerous situation on slippery road surfaces in that once the rear end of the semi-trailer portion of the combination begins to slide sideways it is very difficult to stop the slide. Although the tractor portion of the combination may not be sliding it is possible for the rear end of the semi-trailer portion of the combination to slide laterally outwardly and forwardly resulting in a situation commonly termed "jackknifing." In conventional vehicles provided with substantially rigid frame means interconnecting the front and rear wheels thereof, should the rear wheels of the vehicle begin to slide laterally in one direction, measures may be taken to attempt to stop the sliding of the rear wheels of the vehicle by turning the front steerable wheels of the vehicle in the same direction in which the rear wheels are sliding. However, these same driving procedures are of little help in attempting to stop the rear wheels of a semi-trailer from sliding laterally to one side or the other as the front end of a semi-trailer is free to pivot relative to the associated tractor.

Therefore, if means can be provided for preventing pivotal movement of the semi-trailer portion of a tractor-trailer combination relative to the tractor portion any tendency of the trailer portion to "jackknife" will be greatly reduced inasmuch as lateral sliding movement of the rear end of the trailer portion will also tend to effect lateral sliding movement of the rear wheels of the tractor portion.

Of course, in order for a tractor and semi-trailer combination vehicle to realize its maneuverability potential, the trailer portion thereof must be pivoted relative to the tractor portion at least when the highly maneuverable aspects of a tractor-semi-trailer combination are desired and therefore any means interconnecting the semi-trailer and tractor portions of the vehicle for preventing relative pivotal movement of the two portions must be releasable. In addition, relative pivotal movement between semi-trailer and tractor portions of tractor-trailer combinations is also required during normal highway travel and therefore the proposed interconnection between the semi-trailer and tractor portions of a semi-trailer combination must also be of the type enabling normal pivotal movement of the semi-trailer portion relative to the tractor portion.

It is therefore the main object of this invention to provide means carried by the tractor portion of such a vehicle combination and operatively connected between the steerable wheels of the tractor portion and the semi-trailer portion operative to allow the semi-trailer portion of the combination to pivot relative to the tractor portion to only those instant positions of relative pivotal movement which would occur with a conventional tractor and semi-trailer combination determined by forward movement of the combination accompanied by steering adjustments of the steerable front wheels of the tractor portion of the combination.

Yet another object of this invention is to provide a fifth wheel safety device in accordance with the immediately preceding object and including means by which such a pivotal movement limiting connection between the semi-trailer and the steerable front wheels of the tractor portion may be selectively rendered inoperative.

A further object of this invention is to provide such an aforementioned connection with means operative to render the connection inoperative as soon as the steerable front wheels of the tractor combination are moved from a turned position toward a straight ahead position.

A still further object of this invention, in accordance with the immediately preceding object, is to provide a connection including means operable to render the connection inoperable when the steering wheels of the tractor portion are disposed in straight ahead positions and to render the connection operative only after the steerable wheels of the tractor portion have been turned a predetermined amount in either direction from a straight ahead position.

A still further object of this invention is to provide a connection between the associated tractor and semi-trailer portions of a tractor and semi-trailer combination which is automatically releasable upon normal disengagement of the semi-trailer from the tractor portion of the combination.

A final object of this invention to be specifically enumerated herein is to provide a fifth wheel safety device in accordance with the preceding objects and which will conform to conventional forms of manufacture, be of simple construction and automatic in operation so as to provide a device that will be economically feasible, long-lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatical top plan view of a tractor and semi-trailer combination vehicle shown with the fifth wheel safety device of the instant invention operatively connected between the steerable wheels of the tractor and the semi-trailer;

FIGURE 2 is an enlarged fragmentary bottom plan view of the fifth wheel assembly of the combination vehicle with portions thereof being broken away and shown in horizontal section;

FIGURE 3 is a fragmentary vertical sectional view taken substantially upon the plane indicated by the section line 3—3 of FIGURE 2;

FIGURE 4 is a fragmentary enlarged vertical sectional view taken substantially upon the plane indicated by the section line 4—4 of FIGURE 2;

FIGURE 5 is a fragmentary perspective view of a portion of the safety device of the instant invention which automatically operatively connects the safety device to the semi-trailer portion of the combination as the semi-trailer portion is operatively coupled to the tractor portion of the combination;

FIGURE 6 is an enlarged fragmentary vertical sectional view taken substantially upon the plane indicated by the section line 6—6 of FIGURE 1;

FIGURE 7 is a fragmentary horizontal sectional view taken substantially upon the plane indicated by the section line 7—7 of FIGURE 6;

FIGURE 8 is an enlarged transverse vertical sectional view taken substantially upon the plane indicated by the section line 8—8 of FIGURE 6;

FIGURE 9 is a fragmentary enlarged horizontal sectional view taken substantially upon the plane indicated by the section line 9—9 of FIGURE 6;

FIGURE 10 is a fragmentary enlarged vertical sectional view taken substantially upon the plane indicated by the section line 10—10 of FIGURE 9;

FIGURE 11 is a fragmentary enlarged vertical sectional view illustrating the structural features of the safety device which may be utilized to manually render the safety device inoperative and also a portion of those structural features of the safety device which are operative to automatically render the safety device inoperative; and FIGURE 12 is a horizontal sectional view illustrating the structural features of the bottom of the smaller gear wheel illustrated in FIGURE 7.

Referring now more specifically to the drawings, the numeral 10 generally refers to a tractor-semi-trailer combination vehicle including a tractor portion generally referred to by the reference numeral 12 and a semi-trailer portion generally referred to by the reference numeral 14.

The tractor or tractor portion 12 of the vehicle combination 10 includes the usual rear driving axle assembly 16 and front steerable wheels 18 interconnected by means of a tie rod 20. The semi-trailer portion 14 includes a rear axle assembly 22 and a mounting plate 24 secured to the undersurface of its forward end including a depending fifth wheel pin 26. In addition, the tractor or tractor portion 12 of the combination 10 has a mounting plate 28 secured to the upper surface of the rear end thereof by means of suitable fasteners 32 and a first gear wheel 30 is journaled on an upstanding pin 34 secured to the mounting plate 28. A thrust washer or bearing 36 is disposed on the plate 28 about the pin 34 and is received in a recess 38 formed in the central portion of the lower surface of the first gear wheel 30.

A somewhat conventional fifth wheel plate generally referred to by the reference numeral 40 is provided and is rockably supported from the gear wheel 30 and for rotation therewith by means of a pair of bearing journals 42 secured to the gear wheel 30 by means of fasteners 44 and supporting a pair of pivot shafts 46 which are also journaled by depending journal blocks 48 carried by the fifth wheel plate 40.

The fifth wheel plate 40 includes the usual rearwardly opening slot 50 terminating forwardly in a semi-cylindrical seat 52 and the fifth wheel pin 26 is receivable in the slot 50 and seatingly engageable in the seat 52. Any suitable conventional means such as releasable locking means 54 may be utilized to retain the fifth wheel pin 26 in seated engagement with the seat 52 and the releasable means 54 may have operatively connected thereto an operating lever 56 controllable from the cab portion (not shown) of the tractor 12 for releasing the king or fifth wheel pin 26 when desired.

The fifth wheel plate 40 has a slotted slide 58 mounted thereon by means of a fastener 60 and the slide 58 includes opposite side wedge surfaces 62 engageable with locking pins 64 slidable in suitable noncircular apertures 66 formed in the top wall 68 of the fifth wheel plate 40. The apertures 66 are registrable with blind pockets 70 formed in the mounting plate 24 and one end of the slide 58 is provided with a semi-circular abutment surface 72 disposed for engagement by the fifth wheel pin 26 as the latter is moved forwardly through the slot 50 and towards seating engagement with the seat 52. Final movement of the fifth wheel pin 26 into seated engagement with the seat 52 will cause the fifth wheel pin 26 to engage the abutment surface 72 and shift the slide 58 forwardly relative to its mounting pin or fastener 60 received through the slot 74 formed therein and the cam surfaces 62 will engage the lower ends of the locking pins 64 and urge the pins upward into seated engagement in the pockets 70 thereby locking the fifth wheel plate 40 against rotation relative to the mounting plate 24.

There is also a second gear wheel 78 journaled from the tractor portion 12 in meshed engagement with the first gear wheel 30 and one end of an L-shaped connecting rod 80 is pivotally secured to the second gear wheel 78 as at 82, the other end of the connecting rod 80 being pivotally secured to the rear end of a longitudinally slidable rack gear 84 as at 86.

The forward end of the rack gear 84 is slidably disposed and guidingly received in a housing generally referred to by the reference numeral 88 and fixedly supported from the frame of the tractor portion 12 in any convenient manner. Disposed within the housing 88 is a third gear wheel 90 rotatably journaled on an upstanding shaft 91 fixedly supported within the housing 88 and the third gear wheel 90 is meshed with a fourth gear wheel 92 also journaled in the housing 88 on a second upstanding shaft 94 supported within the housing 88.

The forward end of an elongated lever arm 96 is slotted as at 98 and includes a universal and sliding connection with the tie rod 20. The universal and sliding connection with the tie rod 20 is defined by a slide assembly generally referred to by the reference numeral 100 slidingly disposed in the slot 98 and a ball element 102 carried by the slide assembly and swivelly connected to the tie rod 20 by means of its universal connection with a socket element 104 carried by the tie rod 20.

The slide assembly 100 is fixedly secured to the forward end of an operating arm or lever 106 in any convenient manner such as by fasteners 108 and the control arm is swingable and slidable relative to a dust shield 110 secured in a horizontal slot or opening 112 formed in the front wall 114 of the housing 88, the operating arm 96 also being swingable through the opening 112 and relative to the dust shield 110. In addition, the rear end of the operating lever 106 is bifurcated as at 116 and includes a pair of furcations 118 which generally parallel each other and are L-shaped in cross section. The furcations 118 are rigidly interconnected at their rear ends by means of a transverse brace assembly 120 and the portions of the furcations 118 disposed between their opposite end portions are disposed in rolling engagement with a pair of rollers 122 supported from a collar 123 also journaled on the shaft 94. One end of an elongated pull arm or strap 124 is pivotally supported from the brace assembly 120 by means of a pivot fastener 126 and the other end of the pull arm or strap is bifurcated as at 128 with the free ends of its furcations 130 pivotally secured to the lower end wall of a sleeve member 132 by means of a suitable pivot fastener 134. The pull arm 124 is generally plate-like in configuration intermediate its opposite end portions and rollingly engaged with a supporting roller 136 journaled from the free end of a support arm 138 whose other end portion is pivotally supported from a collar 140 journaled on the shaft 94 below the collar 123 by means of a pivot pin 142. An inclined brace 144 is secured between the center of the arm or lever 138 and the collar 123.

The sleeve member 132 has a pair of diametrically opposite rack gear members 148 secured therein which extend longitudinally of the sleeve member 132 and the sleeve member 132 is telescopically received within the lower end of a downwardly and rearwardly inclined supporting cylinder 150 dependingly secured to the rear end of the operating arm 96 by means of suitable fasteners 152.

The undersurface of the fourth gear wheel 92 includes a plurality of circumferentially spaced and generally radially extending grooves or recesses 154. One sector of the undersurface of the fourth gear wheel 92 is devoid of the grooves or recesses 154 and is provided with a rearwardly and downwardly inclined and opening recess 156 in which is receivable the upper end portion of a locking plunger 158 whose lower end is telescopically received in the upper end of the sleeve member and includes spring detent members 159 engaged with the rack gear members 148.

The lever arm 96 includes a downwardly and rearwardly inclined bore 160 formed therethrough including an upper end counterbore 162 in which a diametrically enlarged head portion 164 of the locking plunger 158 is held captive. The upper end portion of the locking plunger 158 is slidably received through the bore 160 and includes a diametrically reduced wedge and detent-type upper terminal end portion 166 which is seatingly engageable in the grooves or recesses 154. In addition, an elongated slide member 170 is slidingly supported from a suitable housing 172 therefor carried by the depending cylinder 150 and includes an angulated upper end portion 174 which is secured to the diametrically enlarged head portion 164. The lower end of the slide member 170 includes a conventional lost-motion connection 176 with a Bowden cable assembly 178 through a slot 179 in the housing 172 and the remote end of the cable assembly 178 may be disposed adjacent the operator's position within the tractor portion 12.

The slide member 58 includes a forwardly projecting shank portion 182 which is slidably received through a suitable bore 184 formed in the front depending wall 186 of the fifth wheel plate 40 and a compression spring 188 is disposed about the forwardly projecting shank or shank portion 182 between the front wall 186 and the main body portion 190 of the slide member 58 and thereby serves to yieldingly urge the slide member 58 rearwardly free of engagement with the locking pins 64 when the fifth wheel pin 26 is not seated in the seat 52 thereby allowing the locking pins 64 to drop downwardly out of the pockets or recesses 70 to unlock the fifth wheel plate 40 from the mounting plate 42.

In operation, as the tractor portion 12 is backed under the raised forward end of the trailer portion 14 the kingpin 26 moves forwardly through the slot 50 and into engagement with the seat 52. Final movement of the kingpin 26 into engagement with the seat 52 will urge the slide member 58 forwardly and thus cam the locking pins 64 upwardly into the recesses or openings 70 formed in the mounting plate 24. Thus, the fifth wheel plate 40 is locked to the trailer portion 14 against rotation relative to the latter about the fifth wheel pin 26. However, the pivotal connection between the semi-trailer portion 14 and the tractor portion 12 is defined by the first gear wheel 30 and its supporting pin or shaft 34.

After the locking mechanism 54 has been actuated through the lever or arm 56 to secure the fifth wheel pin 26 in seated engagement within the seat 52, the tractor portion 12 may be utilized to pull the trailer portion 14.

When it is desired to turn the combination 10, the front wheels 18 of the tractor portion 12 are first turned slightly an amount allowed by an inherent amount of slack in the connections between the elements connecting the tie rod 20 to the second gear wheel 78 by means of the steering assembly (not shown) provided for the operator of the tractor portion 12 resulting in the tie rod 20 shifting longitudinally so as to swing the forward end of the operating arm 96 which in turn will cause rotation of the fourth gear wheel 92 by means of the locking pin 158 and rotation of the fourth gear wheel 92 will in turn cause rotation of the third gear wheel 90 and longitudinal displacement of the rack gear 84. This will of course also effect rotation of the second gear wheel 78 and thereby, through the meshed engagement of the gear wheels 78 and 30, cause swinging movement of the trailer portion 14 relative to the tractor portion 12 as a result of forward movement of the combination 10 and allow further turning of the front wheels 18. However, the head portion 164 of the locking plunger 158 is normally disposed in engagement with the shoulder 192 defined at the bottom of the counterbore 162 when the steering wheels 18 are disposed in straight forward positions and therefore the fifth wheel safety device of the instant invention is rendered inoperative since the terminal end portion 166 is withdrawn from the socket or opening 156. However, as the tie rod 20 is shifted longitudinally during turning movements of the wheels 18 from the straightforward positions, the slide assembly 100 is caused to slide forwardly in the slot 98 thereby effecting a pull on the operating lever 106 and in turn a pull on the pull arm or lever 124 which causes the sleeve member 132 to slide upwardly in the depending cylinder or cylinder member 150. The detent connection between the sleeve member 132 and the locking pin 158 causes the locking pin 158 to move upwardly during upward movent of the sleeve member 132 thereby positioning the upper terminal end portion 166 of the locking pin 158 within the socket or recess 156. Accordingly, after the steering wheels 18 have been turned a predetermined minimum amount from the straightforward positions, the steering wheels 18 are in effect directly connected to the semi-trailer portion 14 and thereby establish a predetermined angular relationship of the trailer portion 14 relative to the tractor portion 12 determined by the amount the front wheels 18 are turned from the straightforward positions.

As soon as the driver of the combination 10 turns the wheels 18 back to straightforward positions while the semi-trailer portion 14 is still angularly disposed relative to the tractor portion 12, the operating lever 106 moves rearwardly pushing the arm 124 rearwardly and downwardly to retract the sleeve member 132 and thus the locking pin 158. This of course will cause the upper end portion 166 of the locking pin 158 to be withdrawn from the pocket or recess 156 in the fourth gear wheel 92 and again release the semi-trailer portion 14 for free pivotal movement relative to the tractor portion 12. The detent springs 159 of course define a lost-motion connection between the sleeve member 132 and the locking pin 158.

Should the locking pin 158 be withdrawn from engagement with the fourth gear wheel 92 and the tractor and semi-trailer portions 12 and 14 of the combination 10 be sharply angularly disposed relative to each other as though making a left hand turn while the combination 10 is stationary such as might be conventional when jockeying the combination 10 for unloading purposes and the front steerable wheels 18 are turned in the opposite direction effecting upward movement of the sleeve member 132 and the locking pin 158, the upper terminal end portion 166 of the locking pin 158 will seatingly engage one of the grooves or pockets 154 and be retained in that position by means of the detent springs 159. Then, should the tractor portion 12 be utilized to pull the semi-trailer combination 14 while the steering wheels 18 are turned in a direction opposite to the relative angular displacement of the tractor and semi-trailer portions 12 and 14, the coacting cam surfaces of the wedge-type and slightly rounded upper terminal end portion 166 and the grooves or notches 154 in the fourth gear wheel 92 will allow the fourth gear wheel 92 to swing relative to the operating arm 96 and the locking pin 158 while the angular displacement of the tractor and semi-trailer portions 12 and 14 changes. Then, as soon as the opening or pocket 156 is moved into registry with the upper end of the locking pin 158, the upper terminal end portion 166 of the pin 158 will move upwardly into the pocket or opening 156 thereby again locking the fourth gear wheel 92 to the operating arm 96.

The Bowden cable assembly 178 may be provided with any suitable operator (not shown) disposed adjacent the operator's position of the combination 10 and may be selectively utilized to move and retain the locking pin 158 in its downward retracted position. Actuation of the Bowden cable assembly 178 to retract the locking pin 158 is necessary when jockeying the combination 10 is moving rearwardly inasmuch as steering operations of the combination 10 are generally reversed when the combination 10 is moved in a rearward direction.

The recess 156 can of course be elongated along an arc having the shaft 94 as its center of curvature and the portions of the safety device interconnecting the tie rod 20 or lever arm 96 and the first gear wheel 30 could include one of many other types of lost-motion connections.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wheeled draft vehicle and wheeled semi-trailer combination of the type wherein the draft vehicle includes steerable front wheels and the forward end portion of the semi-trailer and the rear end portion of the draft vehicle include first and second portions, respectively, pivotally secured together for relative rotation about an upstanding axis, pivot-limiting means connected between said draft vehicle and said semi-trailer operative to allow only slight relative pivotal movement between said draft vehicle and semi-trailer, motion-transmitting control means operatively connected to said steerable front wheels and to said pivot-limiting means and responsive to steering adjustment of said front wheels to allow a change in the relatively angularly displaced positions of said draft vehicle and semi-trailer, other than said slight relative pivotal movement, only to the relative positions which would normally be effected independently of the pivot-limting means if said steerable front wheels were held stationary in adjusted position and the combination was moving forward with no side slippage of the wheels of the draft vehicle and the semi-trailer.

2. The combination of claim 1 wherein said motion-transmitting control means includes release means selectively operative to render said pivot-limiting means inoperative.

3. The combination of claim 1 wherein said motion-transmitting control means includes release means operative to automatically render said pivot-limiting means inoperative upon movement of said steerable wheels from turned positions toward straight forward positions.

4. The combination of claim 1 wherein said motion-transmitting control means includes release means selectively operative to render said pivot-limiting means inoperative, and second release means operative to automatically render said pivot-limiting means inoperative upon movement of said steerable wheels from turned positions toward straight forward positions.

5. The combination of claim 1 wherein said combination includes a fifth wheel assembly including a fifth wheel plate oscillatably supported from said draft vehicle for rocking movement about a horizontal axis extending transversely of said draft vehicle and a releasable pivotal connection between said semi-trailer and said fifth wheel plate for oscillation of said semi-trailer about an upstanding axis relative to said draft vehicle, said assembly also including means coacting with said semi-trailer operative to automatically lock said semi-trailer against pivotal movement relative to said assembly about said upstanding axis in response to operative coupling of said semi-trailer to said fifth wheel assembly.

6. The combination of claim 5 wherein said fifth wheel plate is supported from a gear wheel journaled from said draft vehicle for rotation about an upstanding axis, a tie rod interconnecting said steerable wheels for simultaneous steering adjustment, said driving connecting including a mechanical connection between said tie rod and said gear wheel operative to pivot said gear wheel in response to movement of said tie rod.

7. The combination of claim 6 wherein said mechanical connection includes a lever arm pivotally supported at one end from said draft vehicle and including a sliding pivot connection with said tie rod at its free end, said lever arm being operatively connected to said gear wheel for angular displacement of the latter in response to angular displacement of the former relative to said draft vehicle.

References Cited
UNITED STATES PATENTS

| | | | |
|---|---|---|---|
| 1,432,401 | 10/1922 | Lloyd | 280—419 |
| 2,692,145 | 10/1954 | Hammond | 280—432 |
| 3,172,685 | 3/1965 | Mandekic | 280—408 |
| 3,212,793 | 10/1965 | Pietroroia | 280—443 |
| 3,250,547 | 5/1966 | Myers | 280—432 |

LEO FRIAGLIA, *Primary Examiner.*